US010125634B2

(12) United States Patent
Merlau et al.

(10) Patent No.: US 10,125,634 B2
(45) Date of Patent: Nov. 13, 2018

(54) COMBUSTOR ASSEMBLY ALIGNMENT AND SECUREMENT SYSTEMS

(71) Applicant: General Electric Company, Schenectady, NY (US)

(72) Inventors: Thomas Michael Merlau, Greenville, SC (US); Stuart Craig Hanson, Anderson, SC (US); Sandra Beverly Kolvick, Greenville, SC (US); Thomas Alan Mogle, II, Simpsonville, SC (US); Loy Milton Miller, Jr., Oak Ridge, TN (US)

(73) Assignee: General Electric Company, Schenectady, NY (US)

( * ) Notice: Subject to any disclaimer, the term of this patent is extended or adjusted under 35 U.S.C. 154(b) by 516 days.

(21) Appl. No.: 14/964,780

(22) Filed: Dec. 10, 2015

(65) Prior Publication Data

US 2017/0167297 A1    Jun. 15, 2017

(51) Int. Cl.
    *F23R 3/60*    (2006.01)
    *F02C 7/20*    (2006.01)
    *F01D 25/28*    (2006.01)

(52) U.S. Cl.
    CPC ............ *F01D 25/28* (2013.01); *F02C 7/20* (2013.01); *F23R 3/60* (2013.01); *F23R 2900/00017* (2013.01); *F23R 2900/00019* (2013.01)

(58) Field of Classification Search
    CPC .. F23R 2900/00017; F23R 3/60; F23R 3/002; F23R 3/283; F02C 7/20; Y10T 29/49897; Y10T 29/49899
    See application file for complete search history.

(56) References Cited

U.S. PATENT DOCUMENTS

| 2,608,057 | A | 8/1952 | Boyd et al. |
| 2,930,492 | A | 3/1960 | Metcalf |
| 3,055,714 | A | 9/1962 | Coffin |
| 3,432,048 | A | 3/1969 | Musgrove et al. |

(Continued)

FOREIGN PATENT DOCUMENTS

| EP | 2 905 430 A1 | 8/2015 |
| WO | 2017/116242 A1 | 7/2017 |
| WO | 2017/116244 A1 | 7/2017 |

OTHER PUBLICATIONS

Extended European Search Report and Opinion issued in connection with corresponding EP Application No. 16202992.0 dated Apr. 5, 2017.

*Primary Examiner* — Gerald L Sung
*Assistant Examiner* — Rene Ford
(74) *Attorney, Agent, or Firm* — Ernest G. Cusick; Frank A. Landgraff (57) ABSTRACT

A combustor assembly alignment system comprises an alignment plate comprising a plurality of alignment plate holes that align with a plurality of combustor assembly flange holes, an alignment plate securement system configured to secure the alignment plate to a combustor assembly flange by passing through a first alignment plate hole of the alignment plate and a first combustor assembly flange hole of the combustor assembly flange, and an alignment tube that extends away from the alignment plate, wherein a hollow interior of the alignment tube aligns with a second combustor assembly flange hole when the alignment plate is secured to the combustor assembly flange.

19 Claims, 6 Drawing Sheets

(56) References Cited

U.S. PATENT DOCUMENTS

| | | | |
|---|---|---|---|
| 4,201,046 A * | 5/1980 | De Negris | F02C 7/222 60/39.37 |
| 4,485,542 A * | 12/1984 | Vasoll | B23P 19/084 29/252 |
| 4,968,244 A * | 11/1990 | Movassaghi | F23C 15/00 431/1 |
| 5,160,254 A * | 11/1992 | Bell | F23C 6/047 431/326 |
| 5,513,547 A | 5/1996 | Lovelace | |
| 5,566,999 A | 10/1996 | Goettl | |
| 5,911,680 A * | 6/1999 | Takeoka | F01D 25/285 431/154 |
| 5,921,075 A * | 7/1999 | Shimoyama | F01D 25/285 431/154 |
| 6,158,102 A | 12/2000 | Berry et al. | |
| 6,640,408 B2 | 11/2003 | Hedley et al. | |
| 7,114,365 B2 | 10/2006 | Rooney, Jr. et al. | |
| 7,178,255 B1 | 2/2007 | Roesel et al. | |
| 7,197,803 B2 | 4/2007 | Kemsley et al. | |
| 7,523,616 B2 | 4/2009 | Zigan et al. | |
| 7,779,540 B2 | 8/2010 | McCaffrey et al. | |
| 8,142,150 B2 | 3/2012 | Frick et al. | |
| 8,151,422 B2 | 4/2012 | Durocher et al. | |
| 8,407,892 B2 * | 4/2013 | DiCintio | F23R 3/06 29/889.22 |
| 8,517,784 B1 | 8/2013 | Bekker et al. | |
| 8,616,038 B2 | 12/2013 | Breen et al. | |
| 8,640,340 B2 | 2/2014 | Foo et al. | |
| 2009/0229068 A1 * | 9/2009 | Henderson | B08B 7/0007 15/316.1 |
| 2011/0209481 A1 * | 9/2011 | Simmons | F23R 3/002 60/746 |
| 2013/0139368 A1 | 6/2013 | Iseki et al. | |
| 2013/0269188 A1 | 10/2013 | Falkenberg | |
| 2017/0167298 A1 | 6/2017 | Kolvick et al. | |
| 2017/0167299 A1 | 6/2017 | Heard et al. | |

* cited by examiner

COMBUSTOR ASSEMBLY ALIGNMENT AND SECUREMENT SYSTEMS

BACKGROUND OF THE INVENTION

The subject matter disclosed herein relates to combustor assemblies and, more specifically, to systems for installing and removing combustor assemblies with respect to a gas turbine.

Gas turbines can include a compressor section, a combustion section, and a turbine section. The compressor section pressurizes air flowing into the turbine. The pressurized air discharged from the compressor section flows into the combustion section, which is generally characterized by a plurality of combustors. Each of the plurality of combustors includes a combustion liner, which defines the combustion chamber of the combustor. As such, air entering each combustor is mixed with fuel and combusted within the combustion liner. Hot gases of combustion flow from the combustion liner through a transition piece to the turbine section of the gas turbine to drive the turbine and generate power More specifically, a gas turbine combustor mixes large quantities of fuel and compressed air and burns the resulting mixture. Combustors for industrial gas turbines can include an annular array of cylindrical combustion "cans" in which air and fuel are mixed and combustion occurs. Compressed air from an axial compressor flows into the combustor. Fuel is injected through fuel nozzle assemblies that extend into each can. The mixture of fuel and air burns in a combustion chamber of each can. The combustion gases discharge from each can into a duct that leads to the turbine.

In some embodiments, combustor assemblies designed for low emissions, may include premix chambers and combustion chambers. Fuel nozzle assemblies in each combustor assembly inject fuel and air into the chambers of the can. A portion of the fuel from the nozzle assembly is discharged into the premix chamber of the can, where air is added to and premixed with the fuel. Premixing air and fuel in the premix chamber promotes rapid and efficient combustion in the combustion chamber of each can, and low emissions from the combustion. The mixture of air and fuel flows downstream from the premix chamber to the combustion chamber which supports combustion and under some conditions receives additional fuel discharged by the front of the fuel nozzle assembly. The additional fuel provides a means of stabilizing the flame for low power operation, and may be completely shut off at high power conditions.

Combustor assemblies need to be installed during the initial build of the gas turbine and may subsequently be removed during subsequent maintenance activities. However, to install, remove or re-install a combustor assembly, a significant amount of force may be required to properly lift, position and/or align the combustor assembly with respect to a combustor assembly. Accordingly, alternative systems for installing and removing combustor assemblies with respect to a gas turbine would be welcome in the art.

BRIEF DESCRIPTION OF THE INVENTION

In one embodiment, a combustor assembly alignment system comprises an alignment plate comprising a plurality of alignment plate holes that align with a plurality of combustor assembly flange holes. The combustor assembly alignment system also comprises an alignment plate securement system configured to secure the alignment plate to a combustor assembly flange by passing through a first alignment plate hole of the alignment plate and a first combustor assembly flange hole of the combustor assembly flange. The combustor assembly alignment system further comprises an alignment tube that extends away from the alignment plate, wherein a hollow interior of the alignment tube aligns with a second combustor assembly flange hole when the alignment plate is secured to the combustor assembly flange.

In another embodiment, a combustor assembly securement system comprises a combustor assembly alignment system comprising an alignment plate comprising a plurality of alignment plate holes that align with a plurality of combustor assembly flange holes on a combustor assembly, an alignment plate securement system configured to secure the alignment plate to a combustor assembly flange by passing through at least a first alignment plate hole of the alignment plate and at least a first combustor assembly flange hole of the combustor assembly flange, an alignment tube that extends away from the alignment plate, wherein a hollow interior of the alignment tube aligns with at least a second combustor assembly flange hole when the alignment plate is secured to the combustor assembly flange, and an alignment rod comprising a turbomachine end and a combustor assembly end, wherein the turbomachine end is configured to be disposed in a first turbomachine flange hole on a turbomachines, and wherein the combustor assembly end is configured to pass through the hollow interior of the alignment tube. The combustor assembly securement system also comprises a jacking system configured to secure the combustor assembly to the turbomachine by being secured to a second turbomachine flange hole and passing through a third combustor assembly flange hole.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
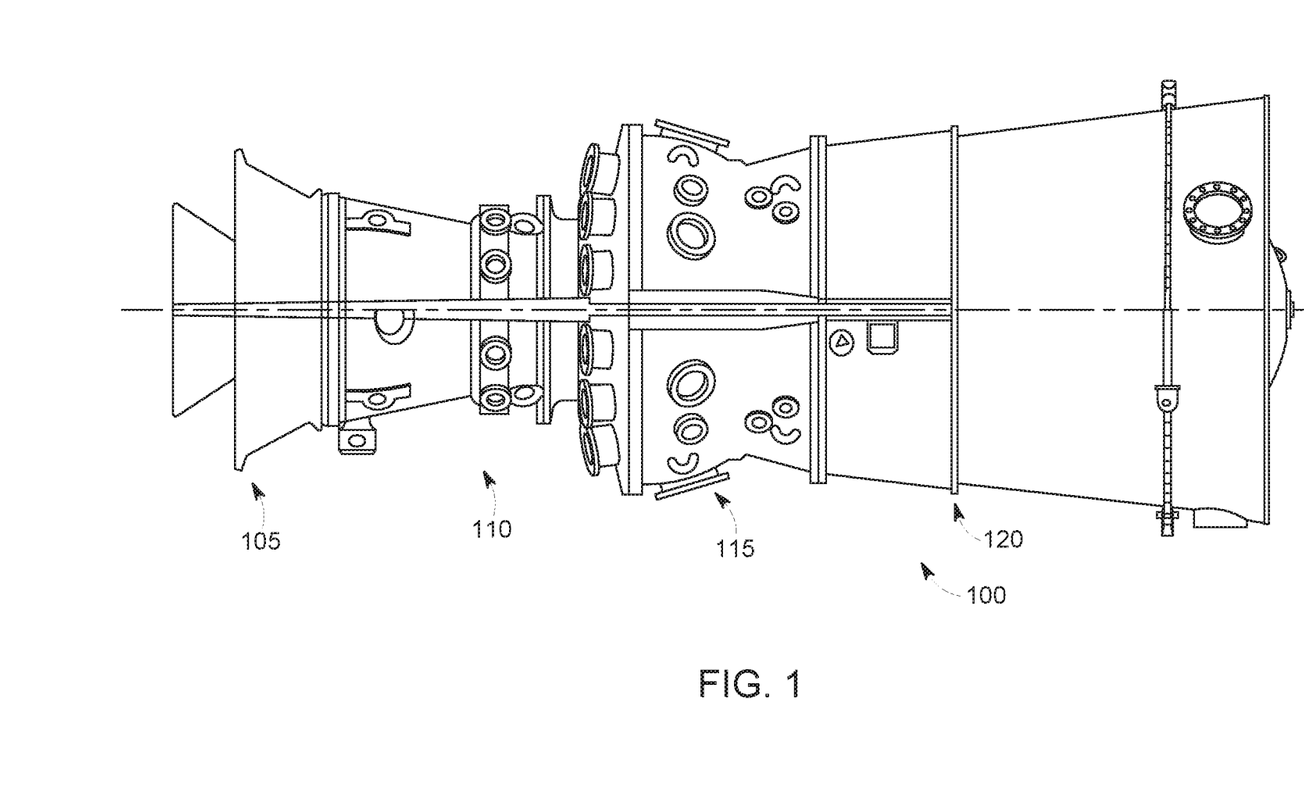
FIG. 1 is a side view of a turbomachine according to one or more embodiments shown or described herein.

Referring now to FIG. 1, some turbomachines, such as gas turbines, aero-derivatives, or the like, burn a fuel and an air mixture during a combustion process to generate energy. FIG. 1 illustrates an example of a turbomachine 100. Generally, the turbomachine 100 comprises an inlet plenum 105 that directs an airstream towards a compressor housed in a compressor casing 110. The airstream is compressed and then discharged to a combustion system 115, where a fuel, such as natural gas, is burned to provide high-energy combustion gases, which drives the turbine section 120. In the turbine section 120, the energy of the hot gases is converted into work, some of which is used to drive the compressor, with the remainder available for useful work to drive a load such as the generator, mechanical drive, or the like (none of which are illustrated).

Figure 2:
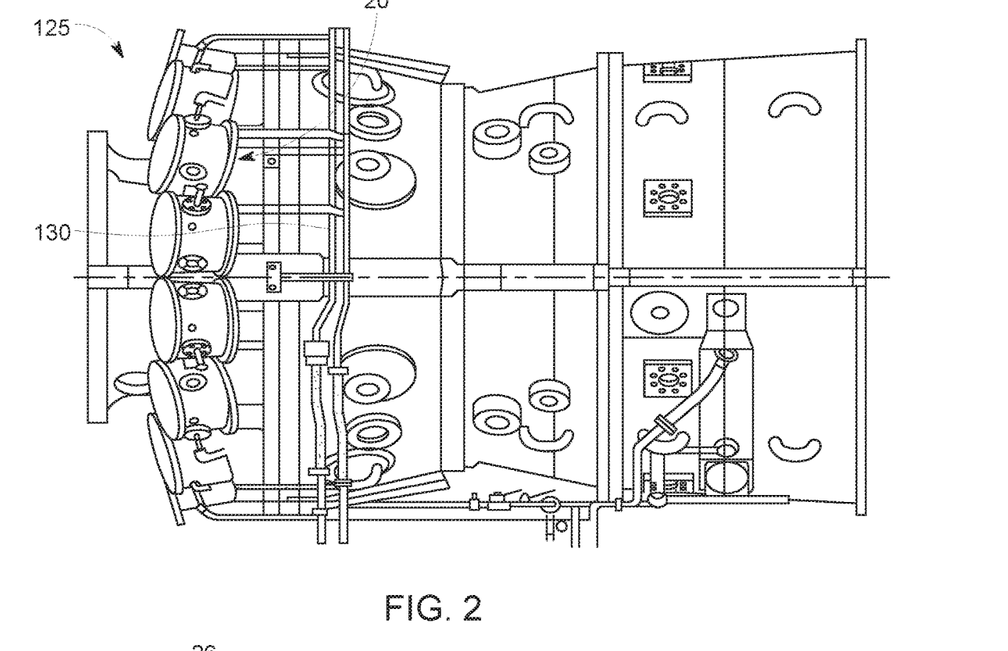
FIG. 2 is a side view of a combustion system according to one or more embodiments shown or described herein.

Referring now additionally to FIG. 2, an embodiment of the combustion system 115 may comprise at least one combustor assembly 20. Some turbomachines 100, such as that illustrated in FIG. 2, may comprise a plurality of combustor assemblies 20 disposed in an annular array around a central axis A. Generally, within each combustor assembly 20 (and more specifically, the combustion can 125 of the combustor assembly 20) the aforementioned combustion process occurs. In some embodiments, combustor assemblies 20 can comprise one or more auxiliary systems 130 such as flame detection systems to monitor the flame burning in some of the combustor assemblies 20. Such flame detection systems may be in the form of a flame scanner, a portion of which may be inserted within the combustor assembly 20. Additional or alternative auxiliary systems 130 may similarly be incorporated into combustor assemblies 20 to monitor, control and/or impact one or more of the combustor assembly processes.

Figure 3:
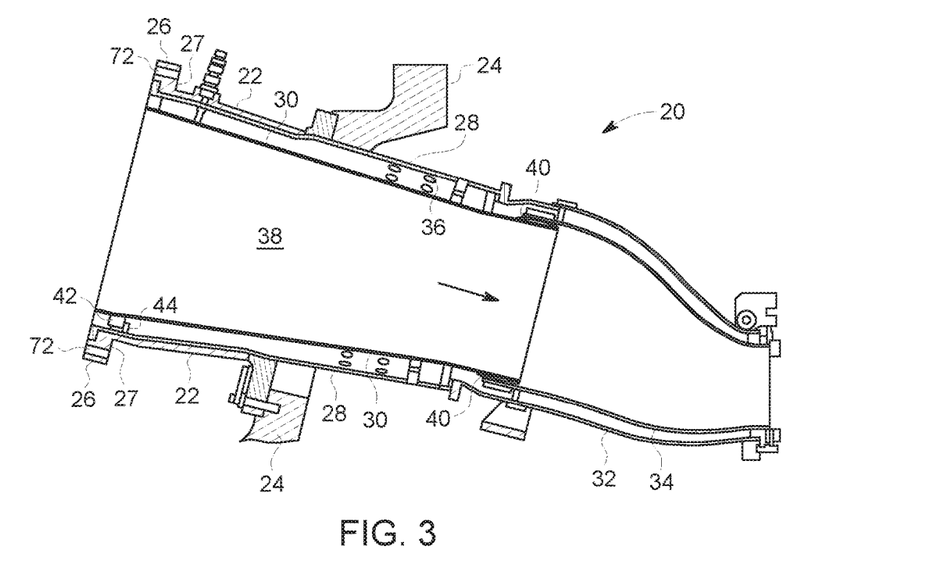
FIG. 3 is a cross-sectional side view of a combustor assembly according to one or more embodiments shown or described herein.

Referring additionally to FIG. 3, a cross-sectional side view of an embodiment of a combustor assembly 20 of a turbomachine 100 is illustrated. The combustor assembly 20 may generally include at least a combustion can 125 and potentially a substantially cylindrical combustion casing 22 secured to a portion of a gas turbine casing 24, such as a compressor discharge casing or a combustion wrapper casing. As shown, a flange 26 may extend outwardly from an upstream end of the combustion casing 22. The flange 26 may generally be configured such that an end cover assembly of a combustor assembly 20 may be secured to the combustion casing 22. For example, the flange 26 may define a plurality of flange holes 72 for attaching the end cover assembly to the combustion casing 22.

In some embodiments, the combustor assembly 20 may also include an internal flow sleeve 28 and/or a combustion liner 30 substantially concentrically arranged within the flow sleeve 28. The combustor assembly 20 may comprise a unibody combustor assembly 20 comprising the combustion can 125 and at least one of the flow sleeve 28 or combustion liner 30 connected to the combustion can 125 as a single pre-assembled structure, or the combustor assembly 20 may comprise an assembly where the combustion can 125, flow sleeve 28 and combustion liner 30 all connect directly to the turbomachine 100 such as to the turbine casing 24 (sometimes referred to as a combustion discharge casing or "CDC"). For example, the flow sleeve 28 and the combustion liner 30 may extend, at their downstream ends, to a double walled transition duct, including an impingement sleeve 32 and a transition piece 34 disposed within the impingement sleeve 32. It should be appreciated that in some embodiments the impingement sleeve 32 and the flow sleeve 28 may be provided with a plurality of air supply holes 36 over a portion of their surfaces, thereby permitting pressurized air from the compressor section 12 to enter the radial space between the combustion liner 30 and the flow sleeve 28.

The combustion liner 30 of the combustor assembly 20 may generally define a substantially cylindrical combustion chamber 38, wherein fuel and air are injected and combusted to produce hot gases of combustion. Additionally, the combustion liner 30 may be coupled at its downstream end to the transition piece 34 such that the combustion liner 30 and the transition piece 34 generally define a flow path for the hot gases of combustion flowing from each combustor assembly 20 to the turbine section 16 of the turbine assembly 10.

In some embodiments, such as that illustrated in FIG. 3, the transition piece 34 may be coupled to the downstream end of the combustion liner 30 with a seal 40 (e.g., a compression seal). For example, the seal 40 may be disposed at the overlapping ends of the transition piece 34 and combustion liner 30 to seal the interface between the two components. For example, a seal 40 may comprise a circumferential metal seal configured to be spring/compression loaded between inner and outer diameters of mating parts. It should be appreciated, however, that the interface between the combustion liner 30 and the transition piece 34 need not be sealed with a compression seal 40, but may generally be sealed by any suitable seal known in the art.

In some embodiments, the combustion liner 30 may also include one or more male liner stops 42 that engage one or more female liner stops 44 secured to the flow sleeve 28 or, in combustor assemblies 20 without a flow sleeve 28, the combustion casing 22. In particular, the male liner stops 42 may be adapted to slide into the female liner stops 44 as the combustion liner 30 is installed within the combustor assembly 20 to indicate the proper installation depth of the combustion liner 30 as well as to prevent rotation of the liner 30 during operation of the turbine assembly 10. Moreover, it should be appreciated that, in some embodiments, male liner stops 42 may be additionally or alternatively disposed on the flow sleeve 28 or combustion casing while the female liner stops 44 are disposed on the combustion liner 30.

In some embodiments, the combustion liner 30 may first be installed within a combustor assembly 20, by being pushed into the combustor assembly 20. For example, the combustion liner 30 can be pushed into the combustor assembly 20 until a force limits further installation depth into the transition piece 34. With continued reference to FIG. 2, a combustion can 125 can then be installed into each respective combustor assembly 20. Specifically, the combustion can 125 can be positioned, aligned and inserted such that its end cover assembly can then abut against the flange 26 of the combustor assembly 20.

While specific embodiments have been presented herein, it should be appreciated that the combustor assembly 20 may comprise a variety of different components that are assembled in a variety of different orders with respect to the individual connections made with the turbomachine 100. For example, the combustor assembly 20 may be completely assembled prior to installation onto the turbomachine 100 (e.g., a unibody combustor assembly 20), may be partly assembled prior to installation on the turbomachine 100, may be completely assembled while connected to the turbomachine 100, or combinations thereof With additional reference to FIGS. 4-8, combustor assembly alignment systems 210 and combustor assembly securement systems 200 can be used to assist in the alignment and securement of combustor assemblies 20 to turbomachines 100. Specifically, can alignment systems 210 can help ensure alignment (e.g., suitable angles and/or orientation) of a combustor assembly 20 as it approaches its respective slot in the turbomachine 100. Combustor assembly securement systems 200 may further be used to help secure the combustor assembly 20 while it is maintained in proper alignment.

To help facilitate such alignment and securement, a combustor assembly securement system 210 can generally comprise the combustor assembly alignment system 210 and a jacking system 240.

Figure 4:
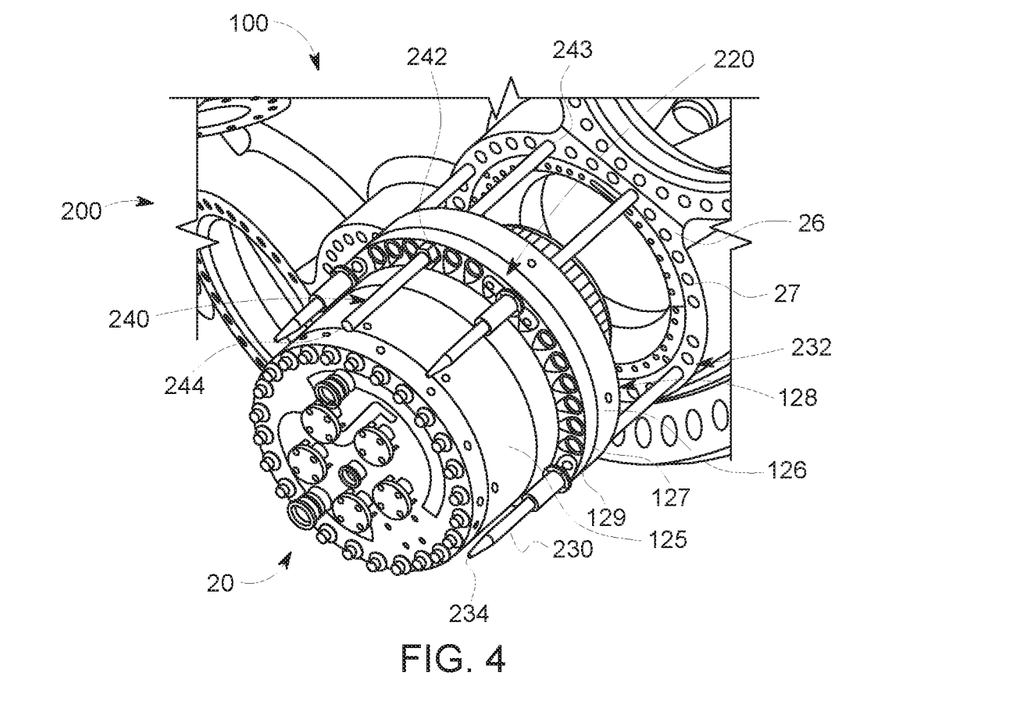
FIG. 4 is a perspective view of a combustor assembly securement system according to one or more embodiments shown or described herein.
Figure 5:
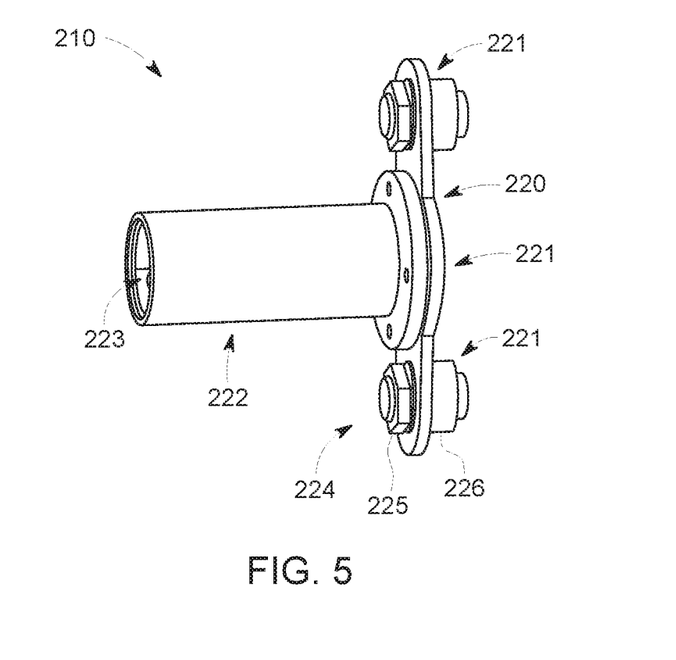
FIG. 5 is a perspective view of a combustor assembly alignment system according to one or more embodiments shown or described herein.

With particular reference to FIGS. 4 and 5, the combustor assembly alignment system 210 can generally comprise an alignment plate 220, an alignment plate securement system 224, and an alignment tube 222. The alignment plate 220, alignment plate securement system 224 and the alignment tube 222 can generally combine to secure to a combustor assembly flange 126 using multiple combustor assembly flange holes 127 so that one or more combustor assembly flange holes 127 can be aligned with their respective turbomachine flange holes 72.

The alignment plate 220 of the combustor assembly alignment system 210 can generally comprise any structure with a plurality of alignment plate holes 221 that can align with a plurality of combustor assembly flange holes 127 on the combustor assembly flange 126 of a combustor assembly 20. The alignment plate 220 can comprise any structure and material suitable holding an alignment tube 222 in place on a combustor assembly flange 126 when aligning and/or securing a combustor assembly 20 to the turbomachine 100.

For example, in some embodiments, the alignment plate 220 may comprise a flat structure that can rest flush with an outer side 129 of a combustor assembly flange 126 (wherein an inner side 128 of the combustor assembly flange 126 is opposite the outer side 129 of the combustor assembly flange 126, and the inner side 128 faces a turbomachine 100 when the combustor assembly 125 is installed thereon). In some embodiments, the alignment plate 220 may comprise an arc configuration such that it matches a portion of the outer ring of the combustor assembly flange 126. In even some embodiments, the alignment plate 220 can comprise a full ring such that it goes around the entire length of the combustor assembly flange 126.

The combustor assembly alignment system 210 further comprises an alignment plate securement system 224. The alignment plate securement system 224 can comprise any system configured to secure the alignment plate 220 to the combustor assembly flange 126 by passing through at least a first alignment plate hole 221 of the alignment plate 220 and at least a first combustor assembly flange hole 127 of the combustor assembly flange 126.

In some embodiments, the alignment plate securement system 224 may comprise at least one alignment plate bolt 225 and at least one alignment plate nut 226. In such embodiments, the alignment plate bolt 225 may be passed through the first alignment plate hole 221 and the corresponding first combustor assembly flange hole 127 and then secured via the alignment plate nut. In even some embodiments, the alignment plate nut 226 may comprise an expandable nut that expands as the alignment plate bolt 225 is passed there through to help keep the alignment plate 220 in place on the combustor assembly flange 126. In some embodiments, the alignment plate securement system 224 may comprise a clamp, grip, magnet, stake, or any other system suitable for keeping the alignment plate 220 in place on a combustor assembly flange 126.

In some embodiments, the combustor assembly alignment system 210 may comprise a plurality of alignment plate securement systems 224 for securing the alignment plate 220 via a plurality of alignment plate hoes 221 and respective combustor assembly flange holes 127. For example, the combustor assembly alignment system 210 may comprise a plurality of alignment plate securement systems 224 configured to secure the alignment plate 220 to the combustor assembly flange 126 by passing through at least a first plurality of alignment plate holes 221 of the alignment plate 220 and at least a first plurality of combustor assembly flange holes 127 of the combustor assembly flange 126. In some embodiments, such as when each alignment plate securement system 224 comprises an alignment plate bolt 225 and an alignment plate nut 226, a first alignment plate bolt 225 and a first alignment plate nut 226 may be inserted through a first alignment plate hole 221 and a respective first combustor assembly flange hole 127. Likewise, a second alignment plate bolt 225 and a second alignment plate nut 226 may be inserted through a second alignment plate hole 221 and a respective second combustor assembly flange hole 127. Such embodiments can expand to include any number of alignment plate securement systems 224 (e.g., alignment plate bolts 225 and alignment plate nuts 226). For example, when the alignment plate 220 covers an increasingly larger portion of the total circumference of the combustor assembly flange 126 (e.g., an eighth of the circumference, a quarter of the circumference, half of the circumference, or more), the alignment plate 220 may comprise an increasing amount of alignment plate securement systems 224 to maintain a firm and fixed connection between the alignment plate 220 and the combustor assembly flange 126.

The combustor assembly alignment system 210 further comprises an alignment tube 222 that extends away from the alignment plate 220. The alignment tube 222 can comprise a hollow interior 223 that aligns with a combustor assembly flange hole 127 when the alignment plate 220 is secured to the combustor assembly flange 126. For example, when referencing that the alignment plate securement system 224 passes through at least a first alignment plate hole 221 and at least a first combustor assembly flange hole 127, the alignment tube 222 can align with at least a second combustor assembly flange hole 127. The first and second combustor assembly flange holes 127 may be at a variety of locations with respect to one another. For example, the first and second combustor assembly flange holes 127 may be directly adjacent to one another, or may be separated from one another via one or more additional combustor assembly flange holes 127.

In some embodiments, when the combustor assembly alignment system 210 comprises a plurality of alignment plate securement systems 224 such that a first alignment plate securement system 224 passes through a first combustor assembly flange hole 127, the hollow interior 223 of the alignment tube 222 aligns with a second combustor assembly flange hole 127, and a second alignment plate securement system 224 passes through a third combustor assembly flange hole 127, the first, second and third combustor assembly flange holes 127 may be at a variety of locations with respect to one another. For example, the alignment tube 222 may be disposed between at least two of the alignment plate securement systems 224 such that the second combustor assembly flange hole 127 (i.e., the one the hollow interior 223 of the alignment tube 222 is aligned with) is disposed between the first and third combustor assembly flange holes 127 (i.e., the two combustor assembly flange holes 127 utilized by the two alignment plate securement systems 224). In other embodiments, the first and third combustor assembly flange holes 127 may be adjacent to one another and the second combustor assembly flange hole 127 may be positioned at either end.

The alignment tube 222 can comprise any configuration that allows for an alignment rod 230 to pass through. For example, the alignment tube 222 may be disposed through the alignment plate 220, next to the alignment plate 220 and/or one or both sides of the alignment plate 220. For example, as illustrated in FIG. 4, in some embodiments the combustor assembly flange 126 may comprise an outer side 129 opposite an inner side 128, wherein the inner side 128 faces a turbomachine 100 when the combustor assembly 20 is installed thereon, and wherein the alignment tube 222 is disposed on the outer side 129 of the combustor assembly flange 126.

In even some embodiments, the combustor assembly alignment system 210 comprises a plurality of alignment tubes 222 that extend away from the alignment plate 220, wherein a hollow interior 223 of each of the alignment tubes 222 align with at least a plurality of combustor assembly flange holes 127 when the alignment plate 220 is secured to the combustor assembly flange 126.

While some particular configurations of combustor assembly flange holes 127 and alignment plate holes 221 utilized by alignment plate securement systems 224 and alignment tubes 222 have been presented herein, it should be appreciated that these are exemplary only and not intended to be limiting. Any other number and configuration of these elements may also be realized to secure the alignment plate 220 to a combustor assembly flange 126 while facilitating the alignment of the combustor assembly 20 to the turbomachine 100.

As illustrated in FIGS. 4 and 6-8, the combustor assembly alignment system 210 can further comprise an alignment rod 230. The alignment rod 230 can comprise a turbomachine end 232 and a combustor assembly end 234, wherein the turbomachine end 232 is configured to be disposed in a turbomachine flange hole 72 and wherein the combustor assembly end 234 is configured to pass through the hollow interior 223 of the alignment tube 222. The alignment rod 230 may thereby rest in a turbomachine flange hole 72 and pass through the alignment tube 222 of an alignment plate 220 attached to a combustor assembly flange 126 to provide alignment guidance of the combustor assembly 20 with respect to the turbomachine 100 during installation (i.e., when the combustor assembly 20 is brought closer to and secured with the turbomachine 100) and/or removal (i.e., with the combustor assembly 20 is released and moved away from the turbomachine 100).

In some embodiments, the combustor assembly end 232 of the alignment rod 230 may comprise a tapered configuration. Such embodiments may assist in the alignment rod 230 entering and passing through the hollow interior 223 of the alignment tube 222 on the alignment plate 220.

In some embodiments, at least a portion of the alignment rod 230 may comprises a threaded surface. The threaded surface may positioned about the turbomachine end 232, the combustor assembly end 234 and/or anywhere between the turbomachine end 232 and the combustor assembly end 234. In some embodiments, the threaded surface of the alignment rod 230 may be configured to engage an interior surface of the turbomachine flange hole 72 (i.e., when the interior surface of the turbomachine flange hole 72 comprises a complimentary surface for the alignment rod 230 to screw into). In some embodiments, the threaded surface of the alignment rod 230 may be configured to engage an interior surface of the combustor assembly flange hole 127 (i.e., when the interior surface of the combustor assembly flange hole comprises a complimentary surface for the alignment rod 230 to screw into). In even some embodiments, the threaded surface of the alignment rod 230 may be configured to engage an interior surface of the alignment tube 222 (i.e., when the interior surface of the alignment tube 222 comprises a complimentary surface for the alignment rod 230 to screw into).

With continued reference to FIGS. 4 and 6-8, in some embodiments, the combustor assembly securement system 200 may comprise a jacking system 240 in addition to the combustor assembly alignment system 210. While the combustor assembly alignment system 210 may facilitate overall alignment between the combustor assembly 20 and the turbomachine, the jacking system can facilitate pulling the combustor assembly 20 towards the turbomachine 100 and securing the two together.

For example, the jacking system 240 can be configured to secure the combustor assembly 20 to the turbomachine 100 by passing through a turbomachine flange hole 72 and a combustor assembly flange hole 127.

For example, when referencing that the alignment plate securement system 224 passes through at least a first alignment plate hole 221 and at least a first combustor assembly flange hole 127, the alignment tube 222 aligns with at least a second combustor assembly flange hole 127, and the alignment rod 230 is disposed in a first turbomachine flange hole 72 and passes through the second combustor assembly flange hole 127 and the alignment tube 222, then jacking system 240 can secure the combustor assembly 20 to the turbomachine 100 by being secured to a second turbomachine flange hole 72 and passing through a third combustor assembly flange hole 127. The jacking system 240 may then be tightened, closed or otherwise secured to pull the combustor assembly 20 towards the turbomachine 100 while the alignment tube 222 slides over the alignment rod 230 to maintain overall alignment.

In some embodiments, the jacking system 240 may comprise a jacking bolt 242 and a jacking nut 248. In such embodiments, a turbomachine end 243 of the jacking bolt 242 may be secured to its respective turbomachine flange hole 72 such as by being screwed into the turbomachine flange hole 72. A combustor assembly end 244 of the jacking bolt 242 may then be passed through a respective combustor assembly flange hole 127 with a jacking nut 248 being placed on the jacking bolt 242 of the outer side 129 of the combustor assembly flange 126. The jacking bolt 242 may then be tightened to force the combustor assembly 20 towards the turbomachine 100 and eventually secured thereto. It should also be appreciated that any additional or alternative configurations of jacking bolts 242 and jacking nuts 248 may be utilized, such as using one or more additional washers, jacking nuts or other elements. In even some embodiments, the jacking system 240 may comprise additional or alternative elements such as ratchet systems, clamps, grips, magnets, stakes or the like.

Figure 6:
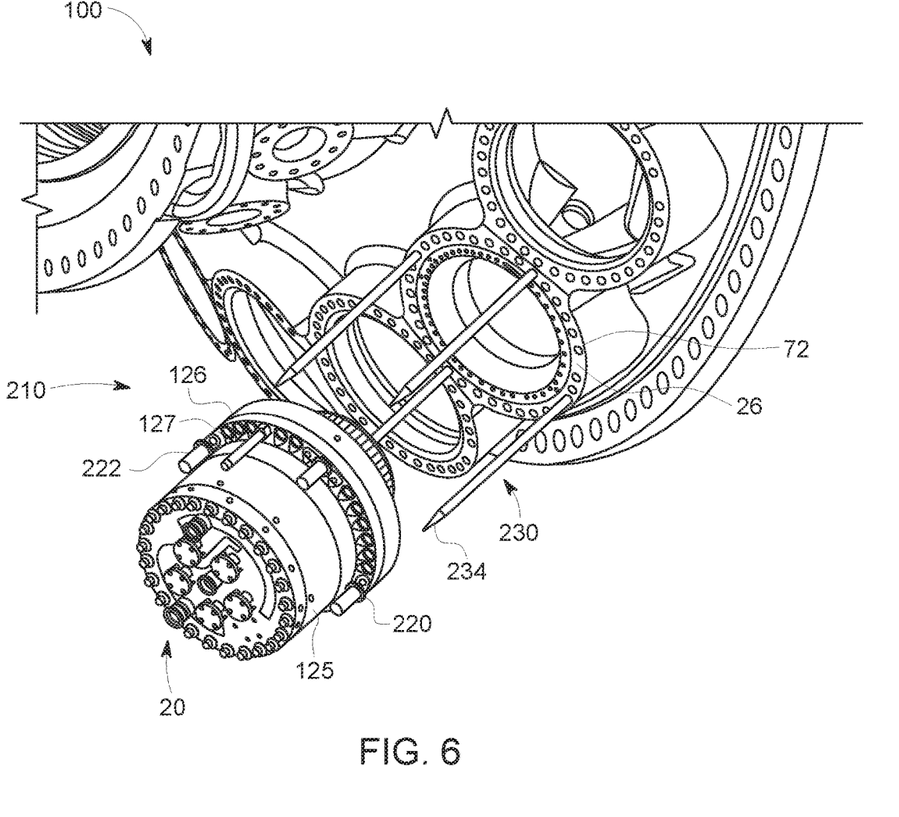
FIG. 6 is a combustor assembly alignment system beginning to align a combustor assembly according to one or more embodiments shown or described herein.
Figure 7:
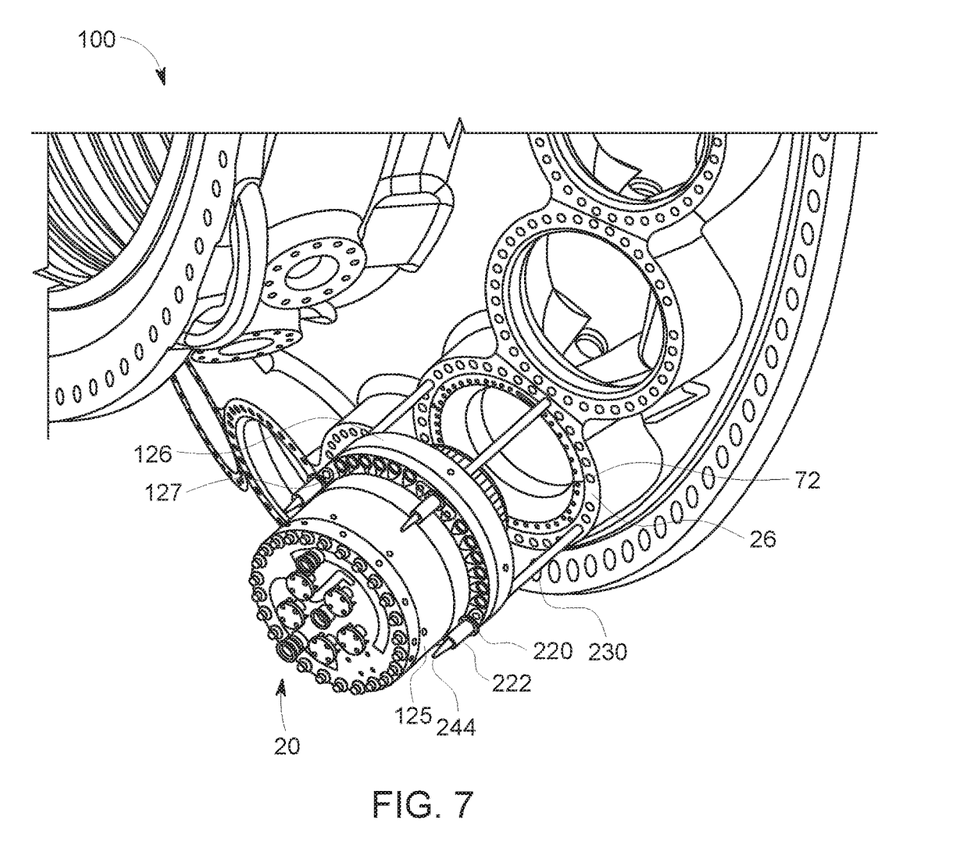
FIG. 7 is the combustor assembly alignment system illustrated in FIG. 6 continuing to align the combustor assembly according to one or more embodiments shown or described herein.

In operation, the combustor assembly securement system 200 may be utilized to facilitate the alignment and installation of a combustor assembly 20 with a turbomachine 100. For example, as illustrated in FIG. 6 one or more combustor assembly alignment systems 210 may be attached to the combustor assembly flange 126 and one or more alignment rods 230 may be disposed in turbomachine flange holes 72. As illustrated in FIG. 7, the combustor assembly 20 may further be brought into close proximity of the turbomachine 100 (e.g., using ratchets, chains, lifts, cranes or the like) such that the alignment rod 230 passes through the alignment tube 222 connected to the alignment plate 220 to position and maintain alignment of the combustor assembly 20.

Figure 8:
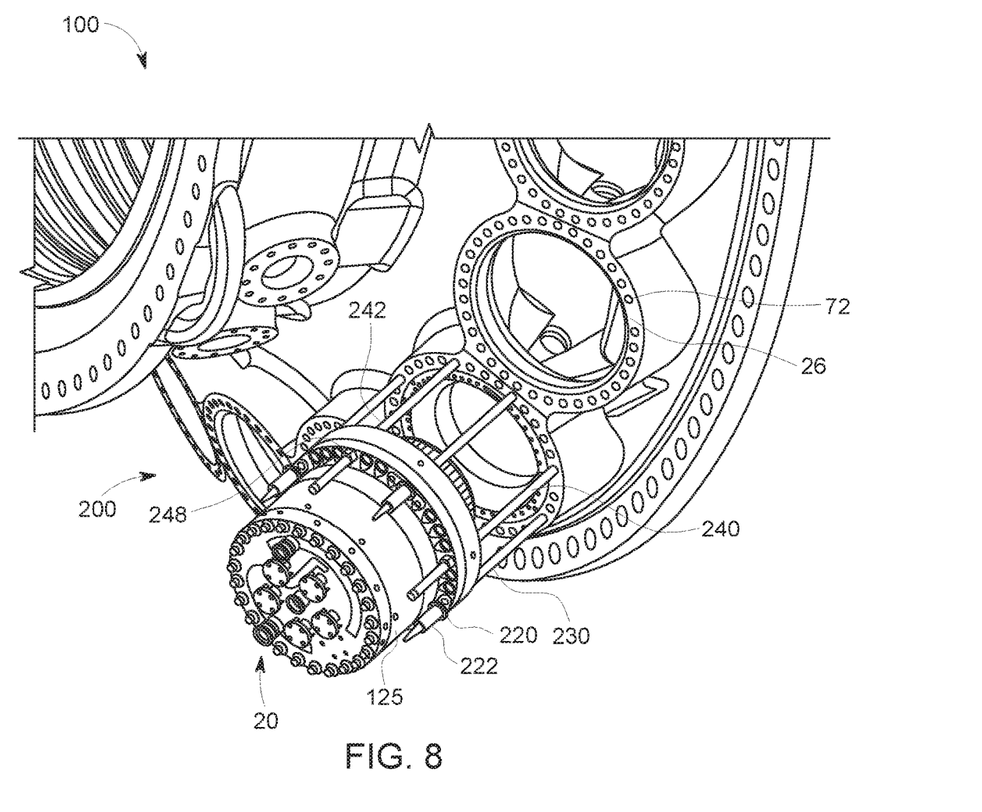
FIG. 8 is a combustor assembly securement system securing the combustor assembly illustrated in FIGS. 6 and 7 according to one or more embodiments shown or described herein.

As illustrated in FIG. 8, the jacking system 240 may thereby be utilized to help move the combustor assembly 20 towards (or away from) the turbomachine 100 and secure the two together. For example, in some embodiments where the jacking system 240 comprises jacking bolts 242 and jacking nuts 248, one or more jacking bolts 242 may be passed through an open combustor assembly flange hole 127 and secured to a turbomachine flange hole 72. The jacking nut 248 may then be placed on the exposed combustor assembly end 244 of the jacking bolt 242 and subsequently tightened to push the combustor assembly 20 towards the turbomachine 100.

In some embodiments, once the jacking system 240 at least partially secures the combustor assembly 20 to the turbomachine 100, all or part of the combustor assembly alignment system 210 (e.g., the alignment plate 220 and/or the alignment rod 230) may be removed from the combustor assembly 20 and the turbomachine 100. In some embodiments, all or part of the combustor assembly alignment system 210 may remain disposed on the combustor assembly 20 or in the turbomachine 100 to assist with future removal or installation operations.

It should now be appreciated that combustor assembly alignment and securement systems as disclosed herein can be provided to help install, remove, or re-install combustor assemblies into combustor assemblies of turbomachines. Such combustor assembly alignment and securement systems can facilitate proper alignment specific to each combustor assembly while also facilitating temporary or permanent securement. These combustor assembly alignment and securement systems may thereby provide for simpler and faster overall installation and removal activities.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A combustor assembly alignment system comprising:
   an alignment plate comprising a plurality of alignment plate holes that align with a plurality of combustor assembly flange holes;
   an alignment plate securement system configured to secure the alignment plate to a combustor assembly flange by passing through a first alignment plate hole of the alignment plate and a first combustor assembly flange hole of the combustor assembly flange;
   an alignment tube that extends away from the alignment plate, wherein a hollow interior of the alignment tube aligns with a second combustor assembly flange hole when the alignment plate is secured to the combustor assembly flange; and
   an alignment rod comprising a turbomachine end and a combustor assembly end, wherein the turbomachine end is configured to be disposed in a turbomachine flange hole, and wherein the combustor assembly end is configured to pass through the hollow interior of the alignment tube.

2. The combustor assembly alignment system of claim 1, wherein the combustor assembly end of the alignment rod comprises a tapered configuration.

3. The combustor assembly alignment system of claim 1, wherein at least a portion of the alignment rod comprises a threaded surface.

4. The combustor assembly alignment system of claim 3, wherein the threaded surface of the alignment rod is configured to engage an interior surface of the turbomachine flange hole.

5. The combustor assembly alignment system of claim 3, wherein the threaded surface of the alignment rod is configured to engage an interior surface of the combustor assembly flange hole.

6. The combustor assembly alignment system of claim 1, wherein the alignment plate securement system comprises at least one alignment plate bolt and at least one alignment plate nut.

7. The combustor assembly alignment system of claim 6, wherein the alignment plate nut comprises an expandable nut.

8. The combustor assembly alignment system of claim 1, wherein the combustor assembly alignment system comprises a plurality of alignment plate securement systems configured to secure the alignment plate to the combustor assembly flange by passing through at least a first plurality of alignment plate holes of the alignment plate and at least a first plurality of combustor assembly flange holes of the combustor assembly flange.

9. The combustor assembly alignment system of claim 8, wherein the alignment tube is disposed between at least two of the alignment plate securement systems.

10. The combustor assembly alignment system of claim 1, wherein the combustor assembly alignment system comprises a plurality of alignment tubes that extend away from the alignment plate, and wherein a hollow interior of each of the alignment tubes align with at least a plurality of combustor assembly flange holes when the alignment plate is secured to the combustor assembly flange.

11. The combustor assembly alignment system of claim 1, wherein the combustor assembly flange comprises an outer side opposite an inner side, wherein the inner side faces a turbomachine when the combustor assembly is installed thereon, and wherein the alignment tube is disposed on the outer side of the combustor assembly flange.

12. A combustor assembly securement system comprising:
   a combustor assembly alignment system comprising:
      an alignment plate comprising a plurality of alignment plate holes that align with a plurality of combustor assembly flange holes on a combustor assembly;
      an alignment plate securement system configured to secure the alignment plate to a combustor assembly flange by passing through at least a first alignment plate hole of the alignment plate and at least a first combustor assembly flange hole of the combustor assembly flange; and,
      an alignment tube that extends away from the alignment plate, wherein a hollow interior of the alignment tube aligns with at least a second combustor assembly flange hole when the alignment plate is secured to the combustor assembly flange; and,
      an alignment rod comprising a turbomachine end and a combustor assembly end, wherein the turbomachine end is configured to be disposed in a first turbomachine flange hole on a turbomachine, and wherein the combustor assembly end is configured to pass through the hollow interior of the alignment tube; and,
   a jacking system configured to secure the combustor assembly to the turbomachine by being secured to a second turbomachine flange hole and passing through a third combustor assembly flange hole.

13. The combustor assembly securement system of claim 12, wherein the jacking system comprises a jacking bolt and a jacking nut.

14. The combustor assembly securement system of claim 12, wherein the combustor assembly end of the alignment rod comprises a tapered configuration.

15. The combustor assembly securement system of claim 12, wherein at least a portion of the alignment rod comprises a threaded surface.

16. The combustor assembly securement system of claim 15, wherein the threaded surface of the alignment rod is configured to engage an interior surface of the turbomachine flange hole.

17. The combustor assembly securement system of claim 15, wherein the threaded surface of the alignment rod is configured to engage an interior surface of the combustor assembly flange hole.

18. The combustor assembly securement system of claim 12, wherein the alignment plate securement system comprises at least one alignment plate bolt and at least one alignment plate nut.

19. The combustor assembly securement system of claim 18, wherein the alignment plate nut comprises an expandable nut.

* * * * *